(12) United States Patent
Kawaguchi et al.

(10) Patent No.: US 12,095,190 B2
(45) Date of Patent: Sep. 17, 2024

(54) WIRE HARNESS WITH TOLERANCE ABSORPTION FOR POSITIONAL DISPLACEMENT

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Daichi Kawaguchi, Yokkaichi (JP); Toshiya Hirooka, Yokkaichi (JP); Jisung Kim, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 331 days.

(21) Appl. No.: 17/765,693

(22) PCT Filed: Sep. 2, 2020

(86) PCT No.: PCT/JP2020/033312
§ 371 (c)(1),
(2) Date: Mar. 31, 2022

(87) PCT Pub. No.: WO2021/079628
PCT Pub. Date: Apr. 29, 2021

(65) Prior Publication Data
US 2022/0344850 A1    Oct. 27, 2022

(30) Foreign Application Priority Data
Oct. 21, 2019 (JP) .................. 2019-192041

(51) Int. Cl.
*H01R 13/11* (2006.01)
*H01R 24/28* (2011.01)
(Continued)

(52) U.S. Cl.
CPC ........... *H01R 13/111* (2013.01); *H01R 24/28* (2013.01); *H02G 1/14* (2013.01); *H02G 3/08* (2013.01)

(58) Field of Classification Search
CPC ...... H01R 13/111; H01R 24/28; H01R 4/184; H01R 9/18; H01R 11/12; H01R 13/193;
(Continued)

(56) References Cited

U.S. PATENT DOCUMENTS 1,835,000 A * 12/1931 Berthold ................ H01R 13/20
439/848
2,430,270 A 11/1947 Bergan
(Continued)

FOREIGN PATENT DOCUMENTS

JP   2017-10703 A   1/2017
JP   2018-45803 A   3/2018
(Continued)

OTHER PUBLICATIONS

Nov. 10, 2020 Search Report issued in International Patent Application No. PCT/JP2020/033312.

*Primary Examiner* — Travis S Chambers
(74) *Attorney, Agent, or Firm* — Oliff PLC

(57) ABSTRACT

A wire harness including: a wire; a wire-side terminal that is electrically connected to the wire; and a terminal block to which the wire-side terminal is attached, wherein: the terminal block includes a holding fitting that holds the wire-side terminal in a state where the wire-side terminal is electrically connected to a contact, the holding fitting includes a plate, and at least one of the wire-side terminal
(Continued)

and the holding fitting includes a curved surface that is in contact with the other of the wire-side terminal and the holding fitting in a state where rotation in two directions around two axes that intersect each other is allowed.

16 Claims, 7 Drawing Sheets

(51) Int. Cl.
*H02G 1/14* (2006.01)
*H02G 3/08* (2006.01)

(58) Field of Classification Search
CPC ....... H01R 13/35; H01R 13/113; H01R 11/11; H01R 9/2416; H02G 1/14; H02G 3/08; H02G 15/06
See application file for complete search history.

(56) References Cited

U.S. PATENT DOCUMENTS

| | | | |
|---|---|---|---|
| 2010/0173538 A1* | 7/2010 | Kashiwada | H01R 13/20 439/816 |
| 2016/0372852 A1 | 12/2016 | Ito | |
| 2018/0077323 A1 | 3/2018 | Sakamoto | |
| 2018/0123301 A1 | 5/2018 | Tsukamoto | |

FOREIGN PATENT DOCUMENTS

| | | | |
|---|---|---|---|
| JP | 2018-74705 A | 5/2018 | |
| WO | WO-2014203999 A1 * | 12/2014 | H01R 13/04 |

\* cited by examiner

WIRE HARNESS WITH TOLERANCE ABSORPTION FOR POSITIONAL DISPLACEMENT

BACKGROUND

The present disclosure relates to a wire harness.

Conventionally, some wire harnesses absorb positional displacement due to tolerance that occurs between a wire and a device to which the wire is attached (see JP 2018-45803A, for example).

In a wire harness disclosed in JP 2018-45803A, positional displacement due to tolerance that occurs between a wire and a device to which the wire is attached is absorbed by a wire having a floating structure.

SUMMARY

Incidentally, in wire harnesses mounted in automobiles such as electric cars and hybrid cars, there is a need for a large current to flow, and the diameter of wires has been increased. However, if the diameter of the wires is increased, in other words, if the wires are thicker, the rigidity of the wires is increased and the wires are unlikely to bend. In this manner, it is difficult to obtain a tolerance absorption effect due to a floating structure as described above.

An exemplary aspect of the disclosure provides a wire harness that can absorb tolerance.

A wire harness according to the present disclosure includes a wire, a wire-side terminal that is electrically connected to the wire, and a terminal block to which the wire-side terminal is attached, and the terminal block includes a holding fitting that holds the wire-side terminal in a state where the wire-side terminal is electrically connected to a contact, and at least one of the wire-side terminal and the holding fitting includes a curved surface that is in contact with the other of the wire-side terminal and the holding fitting in a state where rotation in two directions around two axes that intersect each other is allowed.

Further, a wire harness according to the present disclosure includes a columnar conductor, and a terminal block to which the columnar conductor is attached, and the terminal block includes a holding fitting that holds the columnar conductor in a state of being electrically connected to a contact, and at least one of the columnar conductor and the holding fitting includes a curved surface that is in contact with the other of the columnar conductor and the holding fitting in a state where rotation in two directions around two axes that intersect each other is allowed.

According to the wire harness of the present disclosure, tolerance can be absorbed.

DETAILED DESCRIPTION OF EMBODIMENTS

Description of Embodiments of Disclosure

Figure 1:
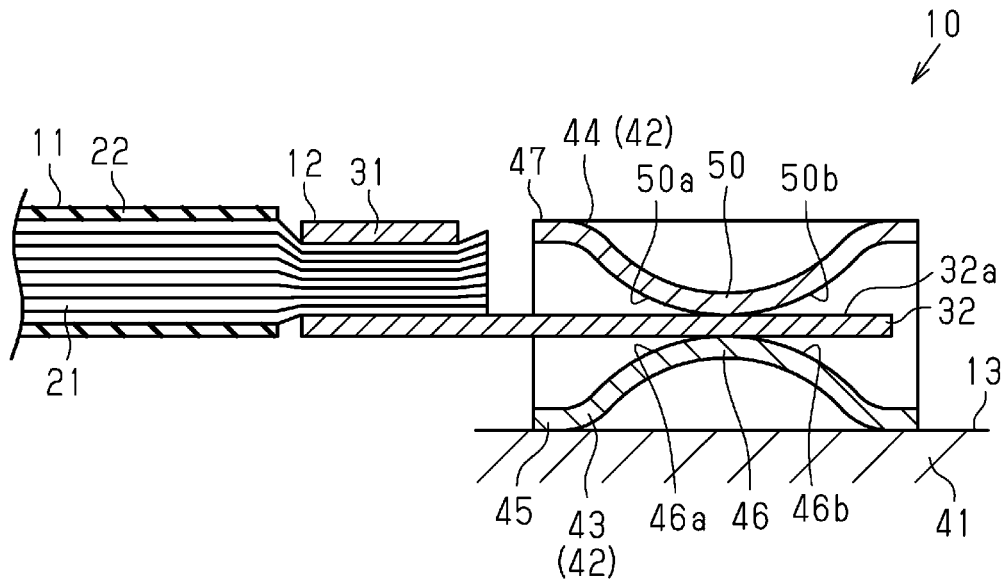
FIG. 1 is a cross-sectional view of a wire harness according to a first embodiment.

First, aspects of the present disclosure will be listed and described.

A wire harness according to the present disclosure is

[1] a wire harness including a wire, a wire-side terminal that is electrically connected to the wire, and a terminal block to which the wire-side terminal is attached, and the terminal block includes a holding fitting that holds the wire-side terminal in a state where the wire-side terminal is electrically connected to a contact, and at least one of the wire-side terminal and the holding fitting includes a curved surface portion that is in contact with the other of the wire-side terminal and the holding fitting in a state where rotation in two directions around two axes that intersect each other is allowed.

With this configuration, at least one of the wire-side terminal and the holding fitting includes the curved surface portion that is in contact with the other of the wire-side terminal and the holding fitting in the state where rotation in the two directions around the two axes that intersect each other is allowed. Accordingly, due to the curved surface portion, the one of the wire-side terminal and the holding fitting can be brought into contact with the other of the wire-side terminal and the holding fitting at any position, making it possible to achieve electrical connection while absorbing tolerance.

[2] It is preferable that the wire-side terminal is formed in a spherical shape and includes the curved surface portion, and the holding fitting includes a flat surface portion that is in contact with the curved surface portion.

With this configuration, due to the wire-side terminal being formed in a spherical shape, rotation in the two directions can be allowed, which can contribute to absorption of tolerance.

[3] It is preferable that the holding fitting is formed in a spherical shape and includes the curved surface portion, and the wire-side terminal includes a flat surface portion that is in contact with the curved surface portion.

With this configuration, due to the holding fitting being formed in a spherical shape, rotation in the two directions can be allowed, which can contribute to absorption of tolerance.

[4] It is preferable that the wire-side terminal is formed in a columnar shape and includes the curved surface portion, and the holding fitting extends in a direction that intersects a central axis of the wire-side terminal, has an arc-shaped surface, and includes the curved surface portion.

With this configuration, since the wire-side terminal is formed in a columnar shape, and the holding fitting extends in a direction that intersects the central axis of the columnar wire-side terminal and has an arc-shaped surface, rotation in the two directions can be allowed using the curved surface portions, which can contribute to absorption of tolerance.

[5] It is preferable that the holding fitting is formed in a cylindrical shape, has a plurality of slits arranged side by side in a circumferential direction, and a depressed portion that is located between the plurality of slits and is depressed radially inward, and the recessed portion includes the curved surface portion that is provided on a radially inner side of the depressed portion.

With this configuration, the holding fitting is formed in a cylindrical shape and includes a plurality of slits arranged side by side in the circumferential direction, and depressed portions that are located between the plurality of slits and are depressed radially inward, and the recessed portions each have a curved surface portion on a radially inner side. Due to one holding fitting being formed in a cylindrical shape and including the recessed portions, the curved surface portion is naturally provided. In other words, the holding fitting can be constituted by a single member.

[6] It is preferable that the wire includes a core wire that is electrically connected to the wire-side terminal, and the wire-side terminal is formed in a cylindrical shape that covers an outer circumference of the core wire and includes the curved surface portion.

With this configuration, since a cylindrical shape that covers the outer circumference of the core wire is formed by the wire-side terminal, and the curved surface portion is included in the cylindrical shape, the structure of the wire-side terminal can be simplified.

[7] It is preferable that the wire-side terminal includes a stepped portion such that a leading end side of the wire-side terminal is larger than a base end side.

With this configuration, since the wire-side terminal has a stepped portion such that the leading end portion of the wire-side terminal is larger than the base end side is provided in the wire-side terminal, the wire-side terminal can be inhibited from coming off the holding fitting.

Further, a wire harness according to the present disclosure is [8] a wire harness including a columnar conductor, and a terminal block to which the columnar conductor is attached, and the terminal block includes a holding fitting that holds the columnar conductor in a state of being electrically connected to a contact, and at least one of the columnar conductor and the holding fitting includes a curved surface portion that is in contact with the other of the columnar conductor and the holding fitting in a state where rotation in two directions around two axes that intersect each other is allowed.

With this configuration, at least one of the columnar conductor and the holding fitting includes the curved surface portion that is in contact with the other of the columnar conductor and the holding fitting in the state where rotation in the two directions around the two axes that intersect each other is allowed. Accordingly, due to the curved surface portion, the one of the columnar conductor and the holding fitting can be brought into contact with the other of the columnar conductor and the holding fitting at any position, making it possible to achieve electrical connection while absorbing tolerance.

[9] It is preferable that the columnar conductor includes a stepped portion such that a leading end side of the columnar conductor is larger than a base end side.

With this configuration, since the columnar conductor has a stepped portion such that the leading end side of the columnar conductor is larger than the base end side, the columnar conductor can be inhibited from coming off the holding fitting.

DESCRIPTION OF EMBODIMENTS OF DISCLOSURE

Specific examples of a protector for a wire harness according to the present disclosure will be described below with reference to the drawings. Note that in the drawings, parts of the configuration may be shown in an exaggerated or simplified manner for convenience of description. Moreover, in the drawings, dimensional ratios of various portions may be different from actual dimensional ratios. "Parallel" and "orthogonal" in the present specification encompass being generally parallel and orthogonal in a range that achieves the operations and effects of the present embodiment, in addition to being strictly parallel and orthogonal. Note that the present disclosure is not limited to these illustrative examples and is defined by the claims, and all changes which come within the meaning and range of equivalency of the claims are intended to be embraced therein.

First Embodiment

Hereinafter, a first embodiment of a wire harness will be described.

As shown in FIG. 1, a wire harness 10 of the present embodiment includes a wire 11, a wire-side terminal 12, and a terminal block 13.

Configuration of Wire 11

The wire 11 includes a core wire 21 and an insulating coating 22 that covers the outside of the core wire 21.

The wire 11 is, for example, a non-shield wire that has no electromagnetic shield structure. A twisted wire formed by twisting a plurality of metal strands can be used as the core wire 21, for example. A metal material such as a copper-based material or an aluminum-based material can be used as the material of the core wire 21. The core wire 21 is formed by extrusion molding, for example.

The insulating coating 22 coats the entirety of the outer circumferential surface of the core wire 21 in the circumferential direction thereof. The insulating coating 22 is formed of an insulating material such as a synthetic resin. The insulating coating 22 may be formed by extrusion molding (extrusion coating) with respect to the core wire 21, for example.

In the case where the wire 11 is used as a high-voltage thick wire, such as when connected to a motor or an invertor of a hybrid car or an electric car, a current of approximately 50 to 400 A is supplied to the wire 11, for example. As a wire in which a current of approximately 50 to 60 A flows, for example, a copper wire having a cross section of 15 $mm^2$, an aluminum wire having a cross section of 20 $mm^2$, or the like can be adopted. As a wire in which a current of approximately 400 A flows, for example, a copper wire having a cross section of 100 $mm^2$, an aluminum wire having a cross section of 160 $mm^2$, or the like can be adopted. When a current of approximately 50 to 400 A flows in the wire 11, the diameter of the wire 11 is increased, and the rigidity of the wire is also increased.

Configuration of Wire-Side Terminal 12

The wire-side terminal 12 is attached to the terminal of the wire 11. Specifically, the wire-side terminal 12 is electrically connected to the core wire 21 of the wire 11.

The wire-side terminal 12 includes a barrel portion 31 and a contact portion 32 located on the leading end side relative to the barrel portion 31.

The barrel portion 31 electrically connects the wire 11 and the wire-side terminal 12 to each other by being crimped to the core wire 21. In other words, the barrel portion 31 is a wire barrel that is electrically connected to the core wire 21. The barrel portion 31 may be an open barrel type or a closed barrel type. FIG. 1 shows the barrel portion 31 of the open barrel type. Although the configuration is adopted in which only the barrel portion 31 that is a wire barrel is included, a configuration including an insulation barrel that covers the outer circumference of the insulating coating 22 and is crimped to the insulating coating 22 can be added to the wire-side terminal.

As shown in FIG. 1, the contact portion 32 extends in a direction in which the barrel portion 31 and the contact portion 32 are arranged side by side.

Figure 2:
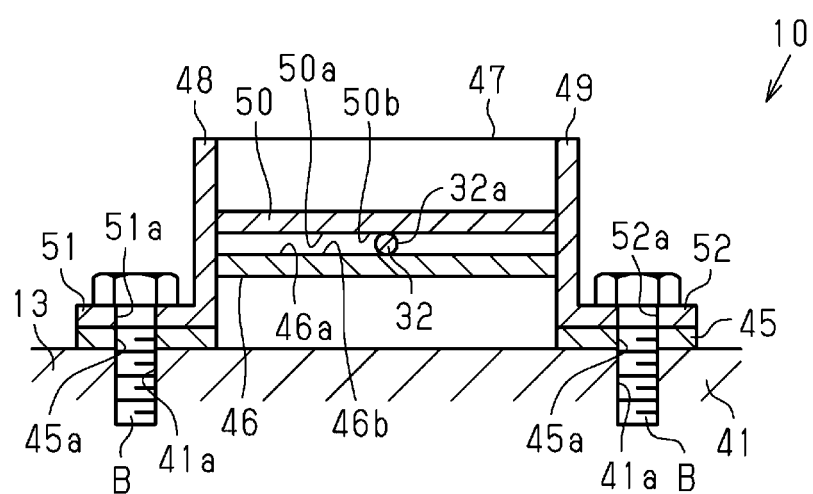
FIG. 2 is a cross-sectional view of the wire harness according to the first embodiment.

As shown in FIG. 2, the contact portion 32 is formed in a columnar shape, for example. "Columnar" mentioned here encompasses having a cross section formed in a perfect circle, an oblong, and an oval. The outer diameter of the contact portion 32 is smaller than the outer diameter of the barrel portion 31, for example. In other words, the contact portion 32 is thinner than the barrel portion 31. Since the contact portion 32 is formed in a columnar shape, the outer surface 32a corresponds to the curved surface portion.

Configuration of Terminal Block 13

The terminal block 13 is to be attached to a motor or an inverter (not shown), for example.

As shown in FIGS. 1 and 2, the terminal block 13 includes a housing 41 and a holding fitting 42 that holds the wire-side terminal 12 with respect to the housing 41.

The housing 41 is constituted by an insulating resin.

The holding fitting 42 includes a first holding fitting 43 and a second holding fitting 44, and holds the wire-side terminal 12 in a manner in which the first holding fitting 43 and the second holding fitting 44 sandwiches the contact portion 32.

The first holding fitting 43 is located on the housing 41 side while the first holding fitting 43 and the second holding fitting 44 are holding the wire-side terminal 12. The second holding fitting 44 is located on the side opposite to the housing 41 while the first holding fitting 43 and the second holding fitting 44 are holding the wire-side terminal 12.

The first holding fitting 43 includes a plate-like portion 45 (plate) and a protruding portion 46 that protrudes in the direction orthogonal to the plate surface from the plate-like portion 45.

If a protruding direction of the protruding portion 46 is taken as outside and a direction opposite to the protruding direction is taken as inside, the cross section of an outer surface 46a located on the outside is formed in an arc shape. Since the outer surface 46a is formed in an arc shape, the protruding portion 46 includes a curved surface portion 46b (curved surface). The protruding portion 46 may be formed in a semi-columnar shape or a semi-cylindrical shape. In the present embodiment, the protruding portion 46 is formed in a semi-cylindrical shape. The protruding portion 46 may be formed in a semi-cylindrical shape by forming a pair of slits that are approximately parallel with each other with respect to the metal plate member, and plastically deforming the plate-like portion between the pair of slits. Note that the "circle" that is used in "arc shape" "semi-columnar shape" and "semi-cylindrical shape" that are illustrated in the present embodiment may be a perfect circle, an oblong, or an oval.

A pair of bolt insertion holes 45a into which a bolt B for fixing to the housing 41 can be inserted is formed in the plate-like portion 45. The pair of bolt insertion holes 45a are formed at locations that sandwich the protruding portion 46. The bolt insertion holes 45a are formed at locations that correspond to a pair of bolt fastening holes 41a provided in the housing 41.

The second holding fitting 44 includes a plate-like portion 47, a pair of side wall portions 48 and 49, a protruding portion 50 that protrudes in the direction orthogonal to the plate surface from the plate-like portion 47, and a pair of flange portions 51 and 52.

The plate-like portion 47 is formed as a rectangular plate, for example.

The pair of side wall portions 48 and 49 extend in the direction orthogonal to the plate surface of the plate-like portion 47 from opposite side edge portions of the plate-like portion 47. The pair of the side wall portions 48 and 49 extend in the same direction. The protruding portion 50 is provided between the pair of the side wall portions 48 and 49.

When the protruding direction of the protruding portion 50 is taken as outside and the direction opposite to the protruding direction is taken as inside, the cross sectional shape of an outer surface 50a located on the outside is formed in an arc shape. The protruding portion 50 includes a curved surface portion 50b due to the outer surface 50a being formed in an arc shape. The protruding portion 50 may be formed in a semi-columnar shape or a semi-cylindrical shape, for example. In the present embodiment, the protruding portion 50 is formed in a semi-cylindrical shape. The protruding portion 50 may be formed in a semi-cylindrical shape by forming a pair of slits that are approximately parallel with each other with respect to the metal plate member, and plastically deforming a plate portion between the pair of slits. In the present embodiment, the semi-cylindrical shape is formed by forming the slits in the boundary portions between the side wall portions 48 and 49 and the plate-like portion 47, and plastically deforming the plate portion between the pair of slits.

The pair of flange portions 51 and 52 include the flange portion 51 that extends from the side wall portion 48 and the flange portion 52 that extends from the side wall portion 49.

Bolt insertion holes 51a and 52a into which the bolt B for fixing the flange portions 51 and 52 to the housing 41 can be inserted are respectively provided in each of the pair of flange portions 51 and 52. The bolt insertion holes 51a and 52a are located so as to sandwich the protruding portion 50 and the pair of the side wall portions 48 and 49. The bolt insertion holes 51a and 52a are formed at locations that correspond to the pair of bolt fastening holes 41a provided in the housing 41. For this reason, the bolt insertion holes 51a and 52a are formed at locations that correspond to the pair of bolt insertion holes 45a on the first holding fitting 43 side. In other words, the bolt insertion holes 45a of the first holding fitting 43, the bolt insertion holes 51a and 52a of the second holding fitting 44, and the bolt fastening hole 41a of the housing 41 are overlapped with each other and fastened with the bolt B, and thus the holding fittings 43 and 44 are fixed to the housing 41. In the state of being fastened with the bolt B, the protruding portion 50 of the second holding fitting 44 is formed in a semi-cylindrical shape such that the protruding portion 50 and the protruding portion 46 of the first holding fitting 43 oppose each other.

The operation of the present embodiment will be described below.

In the wire harness 10 of the present embodiment, due to the contact portion 32 of the wire-side terminal 12 being pinched between the first holding fitting 43 and the second holding fitting 44 of the holding fitting 42, these members are electrically connected to each other. Specifically, the protruding portion 46 of the first holding fitting 43 and the protruding portion 50 of the second holding fitting 44 pinch the contact portion 32. In other words, the curved surface portion 46b of the protruding portion 46 and the curved surface portion 50b of the protruding portion 50 are in contact with the outer surface 32a of the contact portion 32. The portions where the curved surface portions 46b and 50b are respectively in contact with the outer surface 32a each have the contact area that is required for allowing a large current to flow due to material deformation caused by to contact pressure.

The contact portion 32 is formed in a columnar shape. The protruding portion 46 of the first holding fitting 43 and the protruding portion 50 of the second holding fitting 44 that hold the contact portion 32 are each formed in a semi-cylindrical shape that extends in a direction that intersects the columnar contact portion 32. At this time, the wire-side terminal 12 can rotate around the central axis of the contact portion 32 that is formed in a columnar shape, with respect to the holding fitting 42. On the other hand, the wire-side terminal 12 can rotate around the central axis of the protruding portion 46 that is formed in a cylindrical shape. At this time, the wire-side terminal 12 can rotate around the central axis of the protruding portion 50 that is formed in a cylindrical shape. In other words, the wire-side terminal 12 can rotate around the central axis of the contact portion 32 in the state of being held by the first holding fitting 43 and the second holding fitting 44, and can also rotate around the central axes of the protruding portions 46 and 50.

Effects of the present embodiment will be described.

(1-1) The wire-side terminal 12 and the holding fitting 42 respectively include the outer surface 32a serving as the curved surface portion and the curved surface portions 46b and 50b that are in contact with each other in the state where rotation in the two directions around the two axes that intersect each other is allowed. For this reason, the wire-side terminal 12 can be brought into contact with the holding fitting 42 at any position due to the outer surface 32a and the curved surface portions 46b and 50b, enabling electrical connection while absorbing tolerance.

(1-2) The contact portion 32 of the wire-side terminal 12 is formed in a columnar shape, and the protruding portions 46 and 50 extend in a direction that intersects the central axis of the contact portion 32 of the columnar wire-side terminal 12, and the surfaces thereof are formed in an arc shape. In this manner, rotation in the two directions can be allowed using the contact portion 32 and the protruding portions 46 and 50, which can contribute to absorption of tolerance.

Second Embodiment

Next, a second embodiment of the wire harness will be described. Note that, in the present embodiment, differences from the first embodiment will be mainly described, the same members are given the same reference signs, and some or all of the descriptions will be omitted.

Figure 5:
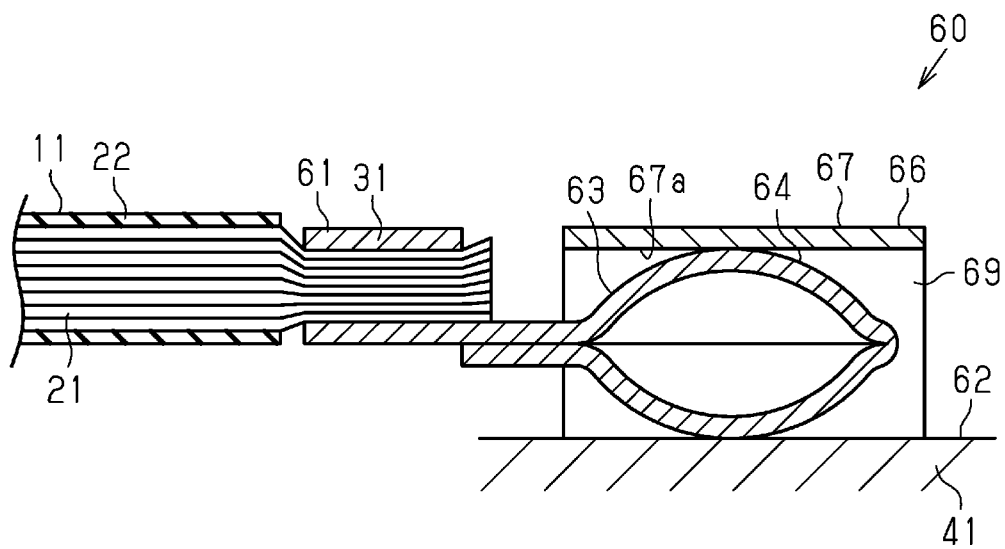
FIG. 5 is a cross-sectional view of the wire harness according to the second embodiment.
Figure 6:
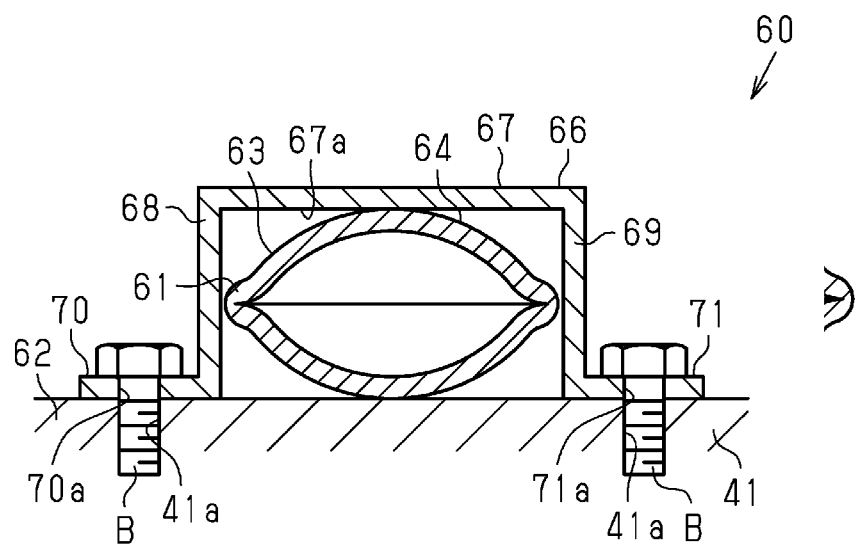
FIG. 6 is a cross-sectional view of the wire harness according to the second embodiment.

As shown in FIGS. 5 and 6, similarly to the first embodiment, a wire harness 60 of the present embodiment includes the wire 11, a wire-side terminal 61, and a terminal block 62.
Configuration of Wire-Side Terminal 61

Figure 3:
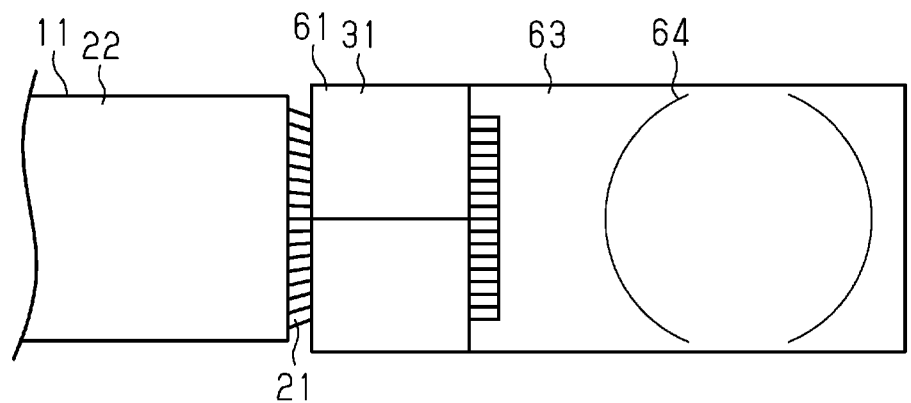
FIG. 3 is a top view showing a wire harness according to a second embodiment in a state where a terminal block is omitted.
Figure 4:
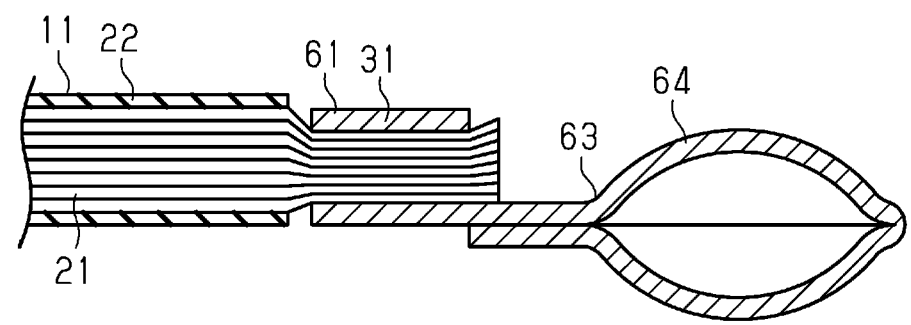
FIG. 4 is a cross-sectional view showing the wire harness according to the second embodiment in a state where the terminal block is omitted.

As shown in FIGS. 3, 4, and 5, the wire-side terminal 61 is attached to the end of the wire 11. Specifically, the wire-side terminal 61 is electrically connected to the core wire 21 of the wire 11.

The wire-side terminal 61 includes the barrel portion 31 and a contact portion 63 located on the leading end side relative to the barrel portion 31.

The barrel portion 31 electrically connects the wire 11 and the wire-side terminal 61 to each other by being crimped to the core wire 21. In other words, the barrel portion 31 is a wire barrel that is electrically connected to the core wire 21.

As shown in FIGS. 3 to 6, the contact portion 63 includes a spherical portion 64. The spherical portion 64 can be formed in an oval shape, for example. The "oval shape" encompasses a rotational oval body in which the diameters in two or more axial directions out of the diameters n the three-axis directions are the same. This "rotational oval body" also encompasses a sphere in which the diameters in the three axis directions are the same, and also encompasses a long sphere and a biased sphere. Also, if the spherical portion 64 is formed as an oval shape, for example, a solid-core structure in which the inner portion is filled, or a hollow structure in which the inner portion is a cavity may be adopted. The spherical portion 64 of the present embodiment is an oval shape having a hollow structure.

The spherical portion 64 can be formed by forming two semi-spherical protruding portions in the direction orthogonal to the plate surface on the sheet-like plate material, and overlapping the openings of the protruding portions of the protruding sides with each other. The two protruding portions are formed at locations spaced apart from each other in the longitudinal direction of the sheet-like plate member, and by folding the sheet-like plate member back by 180 degrees between the two protruding portions, the two protruding portion openings can be overlapped with each other.
Configuration of Terminal Block 62

As shown in FIGS. 5 and 6, the terminal block 62 includes the housing 41 and a holding fitting 66 that holds the wire-side terminal 61 with respect to the housing 41.

The holding fitting 66 and the housing 41 hold the wire-side terminal 61.

The holding fitting 66 includes a plate-like portion 67, a pair of side wall portions 68 and 69, and a pair of flange portions 70 and 71.

The plate-like portion 67 includes a flat surface portion 67a and formed as a rectangular plate, for example.

The pair of side wall portions 68 and 69 extend from the opposite side edge portions of the plate-like portion 67 in the direction orthogonal to the plate surface of the plate-like portion 67. The pair of side wall portions 68 and 69 extend in the same direction.

The pair of flange portion 70 and 71 includes the flange portion 70 that extends from the side wall portions 68 and the flange portion 71 that extends from the side wall portions 69.

Bolt insertion holes 70a and 71a in which the bolt B for fixing the flange portions 70 and 71 to the housing 41 can be inserted are respectively formed in the pair of flange portions 70 and 71. The bolt insertion holes 70a and 71a are located so as to sandwich the pair of side wall portions 68 and 69. The bolt insertion holes 70a and 71a are formed at locations that correspond to the pair of bolt fastening hole 41a provided in the housing 41. That is, due to the bolt insertion holes 70a and 71a of the holding fitting 66 and the bolt fastening holes 41a of the housing 41 being overlapped with each other and fastened with the bolt B, the holding fitting 66 is fixed to the housing 41.

The operation of the present embodiment will be described below.

In the wire harness 60 of the present embodiment, due to the contact portion 63 of the wire-side terminal 61 being pinched between the holding fitting 66 and the housing 41, these members are electrically connected to each other. At this time, the contact portion 63 includes the spherical portion 64 and is in contact with the flat surface portion 67a of the holding fitting 66. The portion where the spherical portion 64 of the contact portion 63 and the flat surface portion 67a are in contact with each other has a contact area required to allow a large current to flow due to material deformation caused by contact pressure.

The spherical portion 64 is allowed to rotate around the two central axes that intersect with respect to the flat surface portion 67a. The two central axes mentioned here mean the axes that are parallel with the flat surface portion 67a.

Effects of the present embodiment will be described.

(2-1) The wire-side terminal 61 includes the spherical portion 64 serving as the curved surface portion that contacts in the state where rotation in the two directions around the two axes that intersect each other is allowed. For this reason, the wire-side terminal 61 can be brought into contact with the holding fitting 66 at any position due to the spherical portion 64, making it possible to achieve electrical connection while absorbing tolerance.

(2-2) Since the wire-side terminal 61 is formed in a spherical shape, rotation in the two directions can be allowed, which can contribute to absorption of tolerance.

Third Embodiment

Next, a third embodiment of the wire harness will be described. Note that, in the present embodiment, differences from the first embodiment will be mainly described, the same members are given the same reference signs, and some or all of the descriptions will be omitted.

Figure 7:
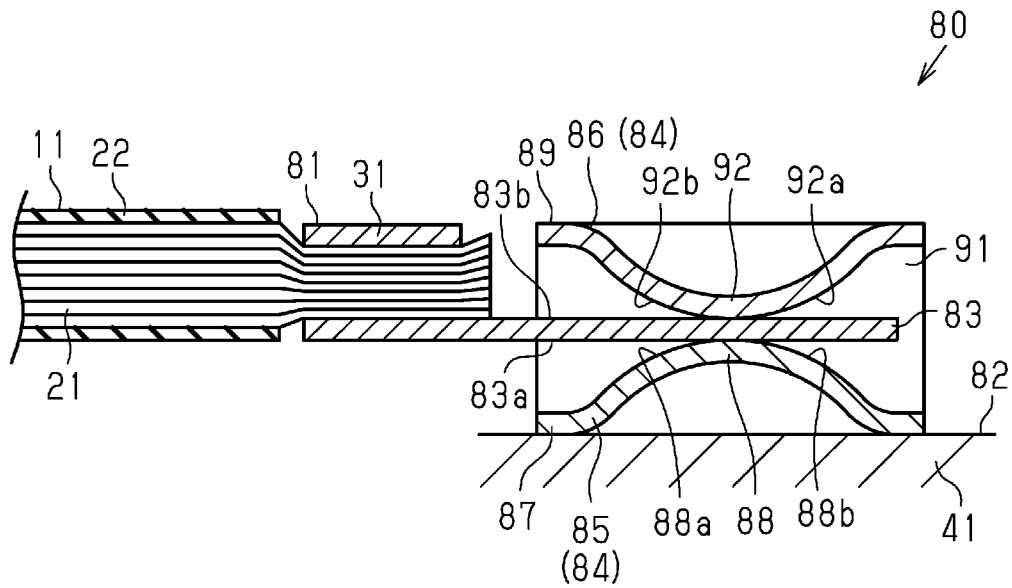
FIG. 7 is a cross-sectional view of a wire harness according to a third embodiment.
Figure 8:
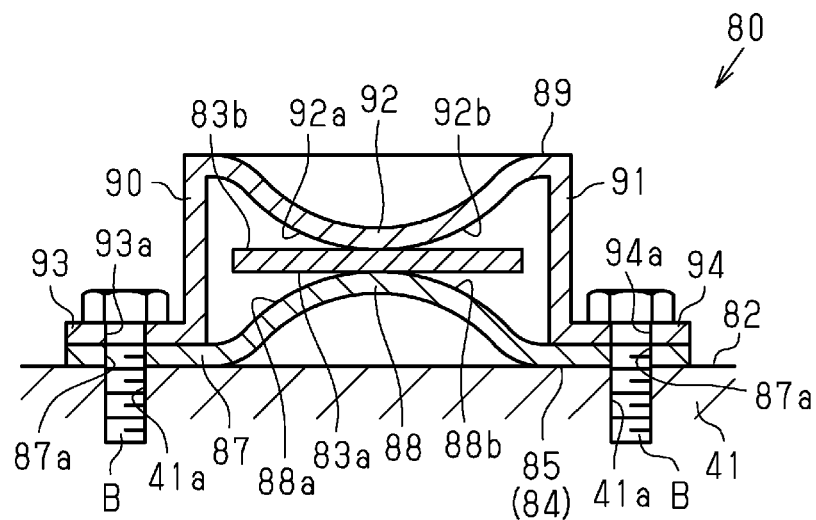
FIG. 8 is a cross-sectional view of the wire harness according to the third embodiment.

As shown in FIGS. 7 and 8, a wire harness 80 of the present embodiment includes the wire 11, a wire-side terminal 81, and a terminal block 82, similarly to the first embodiment.

Configuration of Wire-Side Terminal 81

The wire-side terminal 81 is attached to an end of the wire 11. More specifically, the wire-side terminal 81 is electrically connected to the core wire 21 of the wire 11.

The wire-side terminal 81 includes the barrel portion 31 and a contact portion 83 located on the leading end side relative to the barrel portion 31.

The barrel portion 31 electrically connects the wire 11 and the wire-side terminal 81 to each other by being crimped to the core wire 11. In other words, the barrel portion 31 is a wire barrel that is electrically connected to the core wire 21.

The contact portion 83 includes two flat surface portions 83a and 83b that face to opposite side to each to each other and is formed on a flat plate.

Configuration of Terminal Block 82

The terminal block 82 includes a housing 41 and a holding fitting 84 that holds a wire-side terminal 81 with respect to the housing 41.

The holding fitting 84 includes a first holding fitting 85 and a second holding fitting 86, and holds the wire-side terminal 81 in a manner in which the first holding fitting 85 and the second holding fitting 86 sandwiches the contact portion 83.

The first holding fitting 85 is located on the housing 41 side while the first holding fitting 85 and the second holding fitting 86 hold the wire-side terminal 81. The second holding fitting 86 is located on the side opposite to the housing 41 while the first holding fitting 85 and the second holding fitting 86 are holding the wire-side terminal 81.

The first holding fitting 85 includes a plate-like portion 87 and a protruding portion 88 that protrudes in the direction orthogonal to the plate surface from the plate-like portion 87.

When the protruding direction of the protruding portion 88 is taken as outside, and the direction opposite to the protruding direction is taken as inside, the cross-sectional shape of an outer surface 88a located on the outside is formed in an arc shape. Since the outer surface 88a of the protruding portion 88 is formed in an arc shape, a curved surface portion 88b is provided thereto. The protruding portion 88 may be formed in a semi-oval shape, for example. The "semi-oval shape" in the present embodiment encompasses the shape formed by cutting an oval in half, for example. Note that, similar to the second embodiment, the "oval shape" encompasses a rotational oval body in which the diameters of two or more axial directions out of the diameters in the three axial directions are equal. This rotational oval body includes a sphere in which the diameters in the three-axis directions, and also includes a prolate spheroid and oblate spheroid. In other words, the semi-oval encompasses a spherical segment shape. Also, if the protruding portion 88 is formed in a semi-oval shape, a solid-core structure in which the inner portion is filled, or a hollow structure in which the inner portion is a cavity may be adopted. The protruding portion 88 of the present embodiment is a semi-oval having a hollow structure.

A pair of bolt insertion holes 87a in which the bolt B for fixing to the housing 41 can be inserted are formed in the plate-like portion 87. The pair of bolt insertion holes 87a are formed at locations which sandwich the protruding portion 88. The bolt insertion holes 87a are formed at locations that correspond to the pair of bolt insertion holes 41a provided in the housing 41.

The second holding fitting 86 includes a plate-like portion 89, a pair of side wall portions 90 and 91, a protruding portion 92 that protrudes in the direction orthogonal to the plate surface from the plate-like portion 89, and a pair of flange portions 93 and 94.

The plate-like portion 89 is formed in a rectangular plate, for example.

The pair of side wall portions 90 and 91 extend from the opposite side edge portions of the plate-like portion 89 in the direction orthogonal to the plate surface of the plate-like portion 89. The pair of side wall portions 90 and 91 extend in the same direction. The protruding portion 92 is provided between the pair of side wall portions 90 and 91.

When the protruding direction of the protruding portion 92 is taken as outside and the direction opposite to the protruding direction is taken as inside, the cross-sectional shape of an outer surface 92a located on the outside is formed in an arc shape. Since the outer surface 92a of the protruding portion 92 is formed in an arc shape, the protruding portion 92 includes a curved surface portion 92b. The protruding portion 92 may be formed in a semi-oval, for example. Also, if the protruding portion 92 is formed in a semi-oval, a solid-core structure in which the inner portion is filled or a hollow structure in which the inner portion is a cavity may be adopted. The protruding portion 92 of the present embodiment is a semi-oval that has a hollow structure.

The pair of flange portions 93 and 94 include a flange portion 93 that extends from the side wall portion 90, and a flange portion 94 that extends from the side wall portion 91.

A pair of bolt insertion holes 93a and 94a in which the bolt B for fixing the flange portions 93 and 94 to the housing 41 can be inserted are respectively formed in the pair of flange portions 93 and 94. The bolt insertion holes 93a and 94a are located so as to sandwich the protruding portion 92 and the pair of side wall portions 90 and 91. The bolt insertion holes 93a and 94a are formed at locations that correspond to the pair of bolt fastening holes 41a provided in the housing 41. For this reason, the bolt insertion holes 93a and 94a are formed at locations that correspond to the pair of bolt insertion holes 87a on the first holding fitting 85 side. Specifically, the bolt insertion holes 87a of the first holding fitting 85, the bolt insertion holes 93a and 94a of the second holding fitting 86, and the bolt fastening holes 41a of the housing 41 are overlapped with each other and fastened with the bolt B, and thus the holding fittings 85 and 86 are fixed to the housing 41.

The operation of the present embodiment will be described below.

In the wire harness 80 of the present embodiment, the contact portion 83 of the wire-side terminal 81 is pinched between the first holding fitting 85 and the second holding fitting 84, and is thereby electrically connected thereto. Specifically, the protruding portion 88 of the first holding fitting 85 and the protruding portion 92 of the second holding fitting 86 pinch the contact portion 83. In other words, the curved surface portion 88b of the protruding portion 88 and the flat surface portion 83a of the contact portion 83 are in contact with each other, and the curved surface portion 92b of the protruding portion 92 and the flat surface portion 83b of the contact portion 83 are in contact with each other. The contact portions between the curved surface portions 88b and 92b and the flat surface portions 83a and 83b have the contact area that is required to allow a large current to flow due to deformation of the materials caused by contact pressure.

The contact portion 83 is formed in a flat plate. The protruding portion 88 of the first holding fitting 85 and the protruding portion 92 of the second holding fitting 86 that hold the contact portion 83 are each formed in a semi-oval (semi-sphere). At this time, the wire-side terminal 81 is allowed to rotate around the two central axes that intersect with respect to the protruding portions 88 and 92 of the semi-oval. The two central axes mentioned here mean the axes that are parallel with the flat contact portion 83.

Effects of the present embodiment will be described.

(3-1) The holding fitting 84 includes the protruding portions 88 and 92 serving as the curved surface portions that are in contact with each other in the state where rotation in the two directions around the two axes that intersect each other is allowed. For this reason, the wire-side terminal 81 can be brought into contact with the holding fitting 84 at any position due to the protruding portions 88 and 92, making it possible to achieve electrical connection while absorbing tolerance.

(3-2) Since the respective protruding portion 88 and 92 of the first holding fitting 85 and the second holding fitting 86 of the holding fitting 84 are formed in a sphere, rotation in the two direction can be allowed, which can contribute to absorption of tolerance.

Fourth Embodiment

Next, a fourth embodiment of the wire harness will be described. Note that, in the present embodiment, differences from the first embodiment will be mainly described, the same members are given the same reference signs, and some or all of the descriptions will be omitted.

Figure 9:
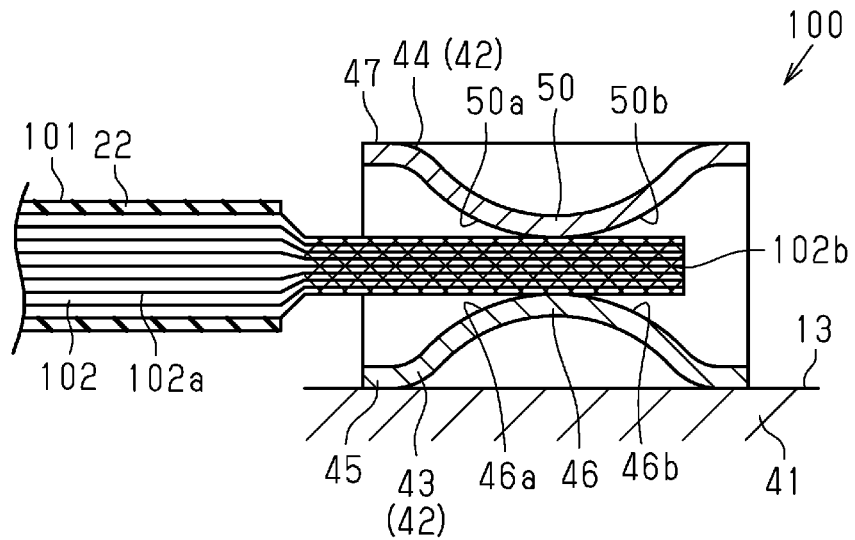
FIG. 9 is a cross-sectional view of the wire harness according to a fourth embodiment.
Figure 10:
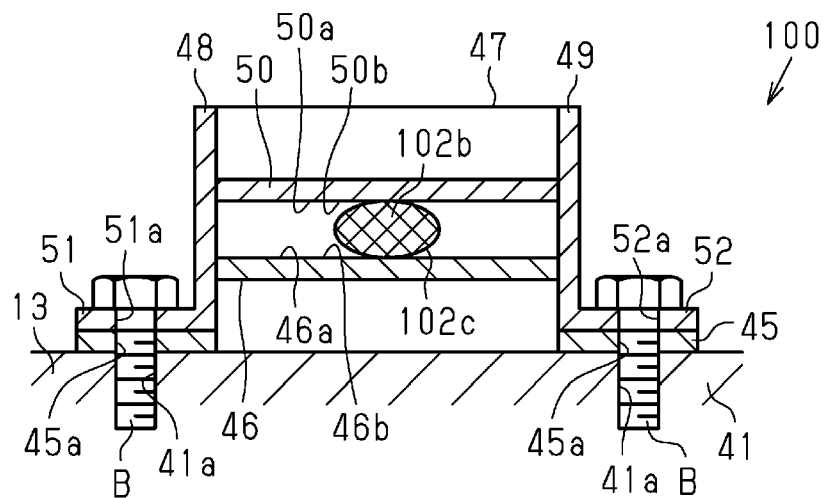
FIG. 10 is a cross-sectional view of the wire harness according to the fourth embodiment.

As shown in FIGS. 9 and 10, similarly to the first embodiment, a wire harness 100 of the present embodiment includes a wire 101 and the terminal block 13. The wire harness 100 of the present embodiment is mainly different from the first embodiment in the wire 101, and the wire-side terminal 12 is omitted. Note that the terminal block 13 has the same configuration as the first embodiment.

The wire 101 includes a core wire 102 and the insulating coating 22 that covers the outside of the core wire 102.

The wire 101 is, for example, a non-shield wire that has no electromagnetic shield structure. A twisted wire formed by twisting a plurality of metal strands can be used as the core wire 102, for example. A metal material such as a copper-based material or an aluminum-based material can be used as the material of the core wire 102. The core wire 102 is formed by extrusion molding, for example.

The core wire 102 of the present embodiment includes a multi-core portion 102a and a single-core portion 102b.

The multi-core portion 102a is a portion mainly covered with the insulating coating 22, and a twisted wire formed by twisting metal strands as described above.

The single core portion 102b is the leading end portion of the multi-core portion 102a, and exposed from the insulating coating 22. The single core portion 102b is formed by compressing the above twisted wire by welding, ultrasonic welding, or thermal pressing into a columnar shape. Here, welding means melting and joining two members at a temperature over the fusing point, for example, and includes resistance welding and laser welding, for example. Also, depositing is removing the oxidized films on the surfaces of two members, bringing the base materials into contact with each other on the molecular (atomic) level, and coupling the two members by intermolecular (interatomic) force.

The single core portion 102b may be formed in one piece with the multi-core portion 102a by being formed in a columnar shape by one of the above methods. Note that "columnar shape" encompasses the shape having a cross section formed in a circle, an oblong, and an oval. Since the single core portion 102b is formed in a columnar shape, the outer surface 102c corresponds to the curved surface portion. In other words, the single core portion 102b corresponds to the columnar conductor.

The single core portion 102b is inserted between the first holding fitting 43 and the second holding fitting 44 of the terminal block 13, and held in the state of being pinched between the first holding fitting 43 and the second holding fitting 44.

The operation of the present embodiment will be described below.

The wire harness 100 of the present embodiment is electrically connected by the single core portion 102b of the wire 101 being pinched between the first holding fitting 43 and the second holding fitting 44 of the holding fitting 42. Specifically, the single core portion 102b is pinched between the protruding portion 46 of the first holding fitting 43 and the protruding portion 50 of the second holding fitting 44. In other words, the curved surface portion 46b of the protruding portion 46 and the curved surface portion 50b of the protruding portion 50 are in contact with the outer circumferential surface of the single core portion 102b. The portions where the curved surface portions 46b and 50b are respectively in contact with the outer circumferential surface of the single core portion 102b have the contact area that is required to allow a large current to flow due to material deformation caused by contact pressure.

The single core portion 102b is formed in a columnar shape. The protruding portion 46 of the first holding fitting 43 and the protruding portion 50 of the second holding fitting 44 that hold the single core portion 102b are each formed in a semi-cylindrical shape that extends in a direction that intersects the columnar single core portion 102b. At this time, the wire 101 including the single core portion 102b can rotate around the central axis of the single core portion 102b that is formed in a columnar shape, with respect to the holding fitting 42. On the other hand, the single core portion 102b can rotate around the central axis of the protruding portion 46 that is formed in a cylindrical shape. At this time, the single core portion 102b can rotate around the central axis of the protruding portion 50 that is formed in a cylindrical shape. In other words, the single core portion 102b can rotate around the central axis of the contact portion 32 in the state of being held by the first holding fitting 43 and the second holding fitting 44, and also can rotate around the central axes of the protruding portions 46 and 50.

Effects of the present embodiment will be described.

(4-1) The single core portion 102b and the holding fitting 42 includes the outer surface 102c serving as the curved surface portion and the curved surface portions 46b and 50b that are in contact with each other while allowing rotation in the two directions around the two axes that intersect each other. For this reason, the single core portion 102b and the holding fitting 42 can be brought into contact with each other at any position due to the outer surface 102c and the curved surface portions 46b and 50b, making it possible to achieve electrical connection while absorbing tolerance.

(4-2) Since no terminal is used on the wire 101 side, an increase in the number of parts can be suppressed.

OTHER EMBODIMENTS

The above embodiments can be modified as below and implemented. The above embodiments and the following modifications can be combined with each other and implemented as long as no technical inconsistencies arise.

Although a configuration is used in the above embodiment in which the wire-side terminals 12, 61, and 81 and the core wire 21 of the wire 11 are connected by being crimped using the barrel portion 31, there is no limitation to this. For example, the core wire 21 may also be connected to the wire-side terminal by ultrasonic welding. In this case, the core wire 21 may also be subjected to ultrasonic welding with respect to the flat surface portion of the wire-side terminal. In other words, the barrel portion 31 of the wire-side terminal can be omitted.

Although not mentioned in particular in the above embodiments, a configuration is also possible in which the wire-side terminals 12, 61, and 81 and the single core portion 102b serving as the columnar conductor have equal cross-sectional areas of the wires 11 and 101 in the longitudinal direction, or the stepped portion may be provided and the cross-sectional areas of the wires 11 and 101 in the longitudinal direction need not be constant.

Figure 11:
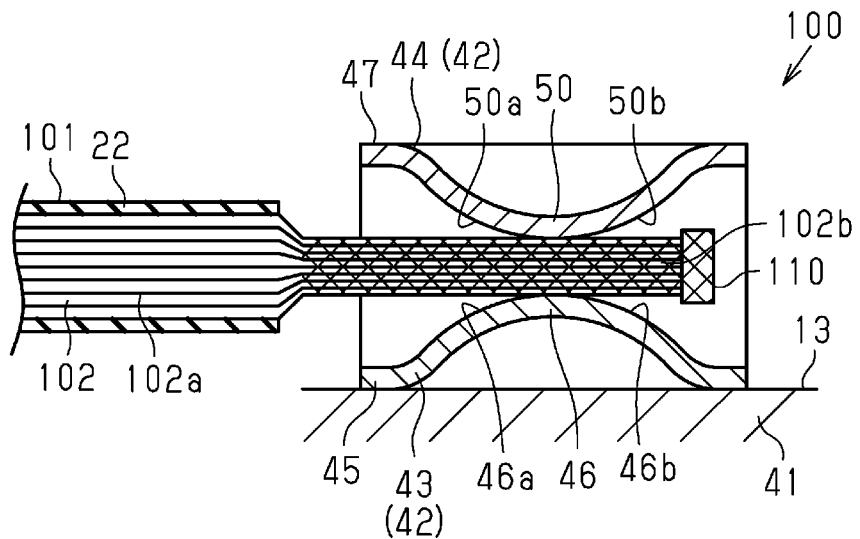
FIG. 11 is a cross-sectional view of the wire harness according to a modification.

As shown in FIG. 11, the wire 101 includes a stepped portion 110 (step) that has a cross section larger than that of the base end side (on the multi-core portion 102a side) on the leading end side of the single core portion 102b serving as the columnar conductor. Due to the stepped portion 110 being provided to the wire 101, the wire can be inhibited from coming out of the holding fitting 42. Note that due to the similar stepped portions being provided to the wire-side terminals 12, 61, and 81, the wire-side terminal 12, 61, and 81 can be inhibited from coming out of the holding fittings 42, 66, and 84.

The curved surface portion described in the above embodiments is an example, and may also be another mode.

Figure 12:
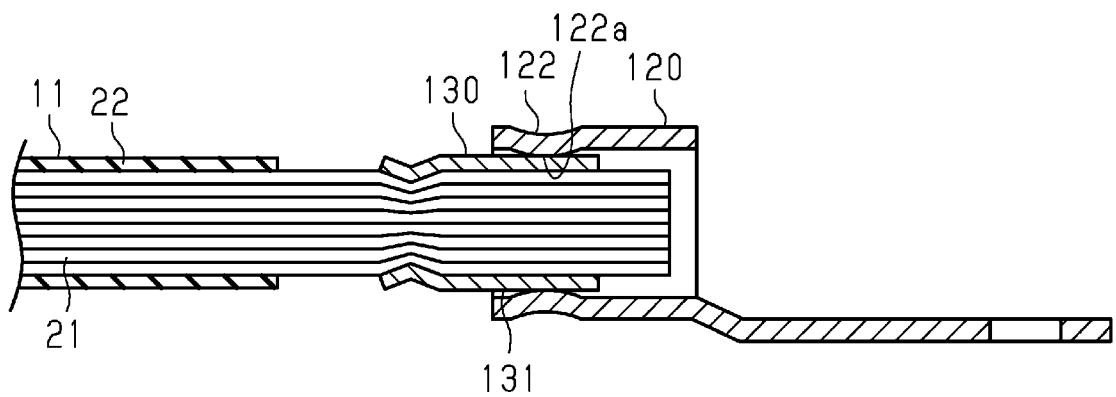
FIG. 12 is a cross-sectional view of the wire harness according to a modification.
Figure 13:
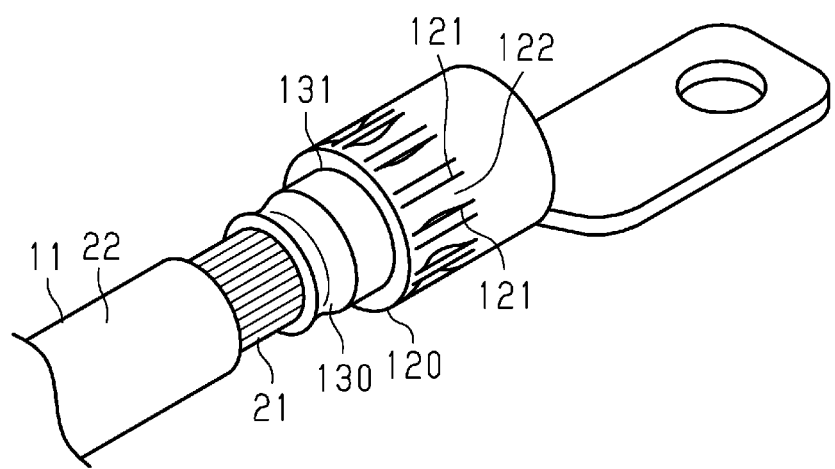
FIG. 13 is a perspective view of the wire harness according to the modification.

As shown in FIGS. 12 and 13, the holding fitting 120 includes a plurality of slits 121 arranged side by side in the circumferential direction and a recessed portion 122 (depression) that is located between the plurality of slits 121 and is recessed radially inward. The recessed portion 122 includes a curved surface portion 122a provided on the radially inner side of the recessed portion 122. In this manner, since the one holding fitting 120 is formed in the cylindrical shape and has the recessed portion 122, the curved surface portion 122a is naturally provided. In other words, the holding fittings 120 can be constituted by a single member.

As shown in FIG. 12, it is preferable that a wire-side terminal 130 is formed in a cylindrical shape that covers the outer circumference of the core wire 21 and includes a curved surface portion 131. With this configuration, the structure of the wire-side terminal 130 can be simplified.

A configuration as below may be also adopted as a configuration in which a curved surface portion is provided to the wire-side terminal or the holding fitting.

For example, a configuration may also be adopted in which a multi-contact terminal having a louver structure is arranged so as to cover the outer circumferential surface of the tubular portion. The multi-contact terminal may also be annualized so as to correspond to the outer circumferential surface when being arranged with respect to the tubular portion, or may also be arranged so as to cover the outer circumferential surface of the tubular portion after having been annualized in advance. The multi-contact terminal includes a plurality of slat portions constituting a louver structure. Each of the plurality of stat portions includes a curved portion in which the multi-contact terminal is curved protrudingly radially outward while the multi-contact terminal is located on the outer circumferential surface of the tubular portion. This radial outer surface of this curved portion corresponds to the curved surface portion.

Also, a configuration may also be adopted in which a multi-contact terminal having a louver structure are arranged so as to cover the inner circumferential surface of the tubular portion. The multi-contact terminal may be annualized so as to correspond to the inner peripheral surface when being arranged with respect to the tubular portion, or may be arranged so as to cover the inner peripheral surface of the tubular portion after being annualized in advance. The multi-contact terminal includes a plurality of slat portions constituting a louver structure. Each of the plurality of slat portions includes a curved portion in which the multi-contact terminal is curved protrudingly radially inward in the state where the multi-contact terminal is located on the tubular inner circumferential surface. This radial inner surface of this curved portion corresponds to the curved surface portion.

Although the above embodiments adopt a configuration in which the wire-side terminal is a male terminal to be inserted into the terminal block, there is no limitation to this. The wire-side terminal may also be a female terminal.

The present disclosure includes the following implementation examples. Reference symbols have been added to the components of the embodiments, not for limitation, but as an aid to understanding. Part of the descriptions in the implementation examples as below may be omitted, and some of the descriptions in the implementation examples may also be selected or extracted to be combined with each other.

[Note 1] A wire harness (10) according to one or a plurality of implementation examples of the present disclosure may include:
a wire (11);
a wire-side terminal (12) that is electrically connected to the wire (11) and includes contact portions (32, 63, 83); and
a terminal block (13, 62, 82) to which the wire-side terminal is attached and that includes a holding fitting (42, 66, 84, 120), in which the holding fitting may include a holding portion (46, 50, 67, 88, 92, 122) that is in electrical contact with a contact portion of the wire-side terminal and holds the contact portion of the wire-side terminal, and at least one of the contact portion of the wire-side terminal and the holding portion of the holding fitting may include a curved surface portion (32a, 46b, 50b, 64, 88b, 92b, 102c, 122a, 131).

According to this implementation example, at least one of the contact portion of the wire-side terminal and the holding portion of the holding fitting includes the curved surface portion. The holding portion of the holding fitting is in electrical contact with the contact portion of the wire-side terminal via the curved surface portion. In this manner, the holding portion of the holding fitting can be in point contact with the contact portion of the wire-side terminal such that the rotation of the wire-side terminal relative to the holding fitting in the two directions around the two axes that intersect each other. In the above embodiment, the holding portion of the holding fitting corresponds to the protruding portion (46) that includes the curved surface portion (46b), the protruding portion (50) that includes the curved surface portion (50b), the plate-like portion (67) that includes the flat surface portion (67a), the protruding portion (88) that includes the curved surface portion (88b), the protruding portion (92) that includes the curved surface portion (92b), and the recessed portion (122) that includes the curved surface portion (122a).

[Note 2] In some implementation examples of the present disclosure, the curved surface portion of at least one of the contact portion of the wire-side terminal and the holding portion of the holding fitting may provide point contact between the holding portion of the holding fitting and the contact portion of the wire-side terminal.

[Note 3] In some implementation examples of the present disclosure, the terminal block (13) may include a housing (41) to which the holding fitting (66) is attached, the holding portion of the holding fitting may include a plate-like portion (67), and the contact portion (63) of the wire-side terminal (12) may include the curved surface portion (64) that includes a sphere that is pinched between the plate-like portion of the holding fitting and the housing of the terminal block.

[Note 4] In some implementation examples of the present disclosure, the contact portion (83) of the wire-side terminal (12) may include the plate-like portion (83), the holding portions (88, 92) of the holding fitting (84) may include a plurality of the curved surface portions (88b, 92b) that have an arc-shaped cross section, and the plurality of curved surface portions of the holding fitting may pinch the plate-like portion of the wire-side terminal.

[Note 5] In some implementation examples of the present disclosure, the contact portion (32) of the wire-side terminal (12) may include the curved surface portion (32a) that is formed in a columnar shape, the holding portion (46, 50) of the holding fitting (42) may include a plurality of the curved surface portions (46b, 50b) that have an arc-shaped cross section, and a plurality of curved surface portions of the holding fitting may pinch the curved surface portion of the wire-side terminal.

[Note 6] A wire harness (100) according to one or a plurality of implementation examples of the present disclosure may include:
a columnar conductor (102b); and
a terminal block (41) to which the columnar conductor is attached and that includes the holding fitting (42) and
the holding fitting may include a holding portion (46, 50) that is in electrical contact with the columnar conductor and holds the columnar conductor, and at least one of the columnar conductor and the holding portion of the holding fitting may include a curved surface portion (46b, 50b, 102b).

[Note 7] In some implementation examples of the present disclosure, the curved surface portion of at least one of the columnar conductor and the curved portion of the holding portion of the holding fitting may provide point contact between the columnar conductor and the holding portion of the holding fitting.

[Note 8] In some implementation examples of the present disclosure, the holding portion (46, 50) of the holding fitting (42) may include the plurality of the curved surface portions (46b and 50b) that have an arc-shaped cross section, and the plurality of curved surface portion of the holding fitting may pinch the columnar conductor.

The invention claimed is:

1. A wire harness comprising:
a wire;
a wire-side terminal that is electrically connected to the wire; and
a terminal block to which the wire-side terminal is attached, wherein:
the terminal block includes a holding fitting that holds the wire-side terminal in a state where the wire-side terminal is electrically connected to a contact, wherein the holding fitting includes a first holding fitting and a second holding fitting, together which sandwich a portion of the wire-side terminal,
the holding fitting includes a plate, and
at least one of the wire-side terminal and the holding fitting includes a curved surface that is in contact with the other of the wire-side terminal and the holding fitting in a state where rotation in two directions around two axes that intersect each other is allowed.

2. The wire harness according to claim 1, wherein:
the wire-side terminal is formed in a spherical shape and includes the curved surface, and
the holding fitting includes a flat surface that is in contact with the curved surface.

3. The wire harness according to claim 1, wherein:
the holding fitting is formed in a spherical shape and includes the curved surface, and
the wire-side terminal includes a flat surface that is in contact with the curved surface.

4. The wire harness according to claim 1, wherein:
the wire-side terminal is formed in a columnar shape and includes the curved surface, and
the holding fitting extends in a direction that intersects a central axis of the wire-side terminal, has an arc-shaped surface, and includes the curved surface.

5. A wire harness comprising:
a wire;
a wire-side terminal that is electrically connected to the wire; and
a terminal block to which the wire-side terminal is attached, wherein:
  the terminal block includes a holding fitting that holds the wire-side terminal in a state where the wire-side terminal is electrically connected to a contact,
  the holding fitting includes a plate,
  at least one of the wire-side terminal and the holding fitting includes a curved surface that is in contact with the other of the wire-side terminal and the holding fitting in a state where rotation in two directions around two axes that intersect each other is allowed,
  the holding fitting is formed in a cylindrical shape, and has a plurality of slits arranged side by side in a circumferential direction, and a depression that is located between the plurality of slits and is depressed radially inward, and
  the curved surface is provided on a radially inner side of the depression.

6. The wire harness according to claim 1, wherein:
the wire includes a core wire that is electrically connected to the wire-side terminal; and
the wire-side terminal is formed in a cylindrical shape that covers an outer circumference of the core wire and includes the curved surface.

7. The wire harness according to claim 1,
wherein the wire-side terminal includes a step such that a leading end side of the wire-side terminal is larger than a base end side.

8. The wire harness according to claim 1,
wherein material deformation due to contact pressure occurs in the curved surface.

9. The wire harness according to claim 1,
wherein the holding fitting and the terminal block are fastened to each other with a bolt to fix the wire-side terminal to the terminal block.

10. A wire harness comprising:
a wire;
a wire-side terminal that is electrically connected to the wire; and
a terminal block to which the wire-side terminal is attached, wherein:
  the terminal block includes a holding fitting that holds the wire-side terminal in a state where the wire-side terminal is electrically connected to a contact,
  the holding fitting includes a plate,
  at least one of the wire-side terminal and the holding fitting includes a curved surface that is in contact with the other of the wire-side terminal and the holding fitting in a state where rotation in two directions around two axes that intersect each other is allowed, and
  material deformation due to contact pressure occurs in the curved surface.

11. The wire harness according to claim 10, wherein:
the wire-side terminal is formed in a spherical shape and includes the curved surface, and
the holding fitting includes a flat surface that is in contact with the curved surface.

12. The wire harness according to claim 10, wherein:
the holding fitting is formed in a spherical shape and includes the curved surface, and
the wire-side terminal includes a flat surface that is in contact with the curved surface.

13. The wire harness according to claim 10, wherein:
the wire-side terminal is formed in a columnar shape and includes the curved surface, and
the holding fitting extends in a direction that intersects a central axis of the wire-side terminal, has an arc-shaped surface, and includes the curved surface.

14. The wire harness according to claim 10, wherein:
the wire includes a core wire that is electrically connected to the wire-side terminal; and
the wire-side terminal is formed in a cylindrical shape that covers an outer circumference of the core wire and includes the curved surface.

15. The wire harness according to claim 10,
wherein the wire-side terminal includes a step such that a leading end side of the wire-side terminal is larger than a base end side.

16. The wire harness according to claim 10,
wherein the holding fitting and the terminal block are fastened to each other with a bolt to fix the wire-side terminal to the terminal block.

* * * * *